United States Patent
Wang et al.

(10) Patent No.: US 9,608,511 B2
(45) Date of Patent: Mar. 28, 2017

(54) METHOD FOR CHARGING MODULAR MULTILEVEL CONVERTER

(71) Applicants: NR ELECTRIC CO., LTD, Nanjing (CN); NR ENGINEERING CO., LTD, Nanjing (CN)

(72) Inventors: Nannan Wang, Nanjing (CN); Jie Tian, Nanjing (CN); Yunlong Dong, Nanjing (CN); Gang Li, Nanjing (CN); Dongming Cao, Nanjing (CN)

(73) Assignees: NR ELECTRIC CO., LTD, Nanjing (CN); NR ENGINEERING CO., LTD, Nanjing (CN)

( * ) Notice: Subject to any disclaimer, the term of this patent is extended or adjusted under 35 U.S.C. 154(b) by 0 days.

(21) Appl. No.: 15/124,678

(22) PCT Filed: Jan. 17, 2014

(86) PCT No.: PCT/CN2014/070757
§ 371 (c)(1),
(2) Date: Sep. 9, 2016

(87) PCT Pub. No.: WO2014/111035
PCT Pub. Date: Jul. 24, 2014

(65) Prior Publication Data
US 2017/0040885 A1    Feb. 9, 2017

(30) Foreign Application Priority Data

Jan. 15, 2013    (CN) .......................... 2013 1 0014548

(51) Int. Cl.
*H02M 1/36*    (2007.01)
*H02M 1/32*    (2007.01)
*H02M 7/483*    (2007.01)

(52) U.S. Cl.
CPC ............... *H02M 1/32* (2013.01); *H02M 1/36* (2013.01); *H02M 7/483* (2013.01); *H02M 2001/325* (2013.01); *H02M 2007/4835* (2013.01)

(58) Field of Classification Search
CPC ........ H02M 7/217; H02M 7/219; H02M 7/42; H02M 7/44; H02M 7/48; H02M 7/483;
(Continued)

(56) References Cited

U.S. PATENT DOCUMENTS

| | | | |
|---|---|---|---|
| 2011/0013441 A1* | 1/2011 | Gruber | H02M 1/36 363/154 |
| 2012/0229080 A1* | 9/2012 | Leu | H02M 7/483 320/107 |

(Continued)

FOREIGN PATENT DOCUMENTS

| | | |
|---|---|---|
| CN | 101795057 A | 8/2010 |
| CN | 102170140 A | 8/2011 |

(Continued)

OTHER PUBLICATIONS

Ding Guanjun et al Submodule Capacitance Parameter and Voltage Balancing Scheme of a New Modular Multilevel VSC Proceedings of CSEE, 2009, vol. 29 No. 30, 1-6.

*Primary Examiner* — Timothy J Dole
*Assistant Examiner* — Ivan Laboy Andino
(74) *Attorney, Agent, or Firm* — Gokalp Bayramoglu

(57) ABSTRACT

A method for charging a modular multilevel converter includes: firstly, electrifying DC side of a converter; after voltages of submodules are stabilized, deblocking the converter, turning on all the submodules, then reducing the number of turned on submodules in phase unit; when over-current occurs on a bridge arm, temporarily increasing the number of turned on submodules to suppress the over-current; after the voltages of the sub-modules are stabilized, (Continued)

continuously reducing the number of the turned on submodules until the number of the turned on submodules in the phase unit is finally equal to the number of working submodules of the bridge arm, so as to smoothly transit to a normal operation state. The DC side is charged, such that the voltages of the submodules reach a working voltage before the converter normally operates, and an impacting current is avoided in the charging process by using a proper control strategy.

7 Claims, 3 Drawing Sheets

(58) Field of Classification Search
CPC ...... H02M 7/49; H02M 7/537; H02M 7/5375; H02M 7/5387; H02M 7/797; H02M 1/32; H02M 1/36; H02M 2007/4835; H02M 2001/322; H02M 2001/325; H02J 3/18; H02J 3/36
See application file for complete search history.

(56) References Cited

U.S. PATENT DOCUMENTS

| | | | | |
|---|---|---|---|---|
| 2013/0169257 | A1* | 7/2013 | Baek | G05F 3/02 323/304 |
| 2014/0002048 | A1* | 1/2014 | Pang | H02M 11/00 323/304 |
| 2014/0146586 | A1* | 5/2014 | Das | H02M 1/36 363/49 |
| 2015/0162848 | A1* | 6/2015 | Harnefors | H02J 3/1814 363/78 |
| 2016/0028303 | A1* | 1/2016 | Chataignere | H02M 1/36 320/107 |

FOREIGN PATENT DOCUMENTS

| | | |
|---|---|---|
| CN | 102739030 A | 10/2012 |
| CN | 102832801 A | 12/2012 |
| CN | 103078539 A | 5/2013 |

* cited by examiner

METHOD FOR CHARGING MODULAR MULTILEVEL CONVERTER

TECHNICAL FIELD

The present invention relates to the field of power electronics, and more particularly, to a method for charging a modular multilevel converter.

BACKGROUND

Modular multilevel converter implements high-voltage output by using low-voltage devices without the need to directly connect switch devices in series. It avoids the issue of series voltage balancing, and is suitable for high-voltage large-capacity applications, for example, flexible direct-current transmission applications. A schematic diagram of a main circuit topological structure of a three-phase modular multilevel converter (MMC) is Shown in FIG. 1(a), including three phase units, where each phase unit includes an upper bridge arm and a lower bridge arm, and each bridge atm consists of several submodules (SM) and one converter reactor in series. The structure of the submodule is shown in FIG. 1(b), which consists of an IGBT half bridge as a switch element and a direct current energy storage capacitor C in parallel, where the direct current energy storage capacitor C is further in parallel with a discharge resistor R. Each submodule includes three working states, as shown in FIG. 2. In a locking state, the submodule may be charged based on the single-phase conductivity of a diode; in an on state, the submodule may be charged or discharged according; to a direction of a current in the bridge arm; and in an off state, the capacitor of the submodule is bypassed, but the capacitor would discharge slowly because it is in parallel with the discharge resistor. To improve the reliability, each bridge arm may further include a certain number of standby submodules, and the number of working submodules of each bridge arm is less than or equal to the number of submodules in series in the bridge arm.

Before the modular multilevel converter works, the capacitors of the submodules need to be charged to a working voltage, to ensure that a difference between superimposed voltages generated by turned-on submodules in the phase units and a voltage at a direct current side is relatively small when the converter is normally unlocked; otherwise, a relatively high impulse current would be caused, and in a severe case, the switch devices may be damaged. When charged via an alternating current side, the capacitors of the submodules can be charged to the working voltage approximately, and normal unlocking of the converter would not cause an impulse current. However in some special cases, for example, in case of the black-start of a flexible direct current system, the capacitors of the submodules of the modular multilevel converter can only be charged via the direct current side. In this case, before unlocking, the capacitors of the submodules can only be charged to around half of the working voltage, and the converter cannot be normally unlocked. Therefore, it is necessary to employ an appropriate strategy to prevent the impulse current.

"Submodule Capacitance Parameter and Voltage Balancing Scheme of a New Modular Multilevel VSC" (Proceedings of CSEE, 2009, Vol. 29 No. 30, 1~6) by DING Guanjun et al. mentioned a charging method using an auxiliary power supply (Method 1). In the method, a direct current voltage source close to a rated voltage of the submodules is selected and bridged between the positive and negative electrodes of the direct current side of the converter, and throw-in and throw-off of the submodules are controlled such that the capacitor voltages of the submodules rise to the rated value approximately.

"Method for Starting Flexible Direct-Current Transmission System of Modular Multilevel Converter" (at the patent application stage, Application Publication No.: CN201110100456.1) by TANG Guangfu, Kong Ming, et al. mentioned a starting process of a flexible direct current system, in which an active system at one end charges two converter stations (Method 2). An active end converter (station 1) is first charged uncontrollably to create a direct current voltage, and a station-2 converter is unlocked after voltages of submodules of the two stations become stable. The knife of a bypass resistor of the station 1 is closed after capacitor voltages of the submodules of the station-2 converter become stable, then the station-1 converter is unlocked, and finally, the station-2 converter is connected to the grid in a synchronizing mode.

Disadvantages of Method 1 above lie in that: in a bridge arm/phase charging process of the converter, only one submodule can be charged each time, which requires a certain period of time when there is a current-limiting resistor, and it takes a relatively long time to charge the whole converter. After charging of all the submodules is completed, a submodule charged earlier may have a relatively low voltage due to slow discharge by a parallel discharge resistor. Meanwhile, it is complex to separately charge each submodule, and a complex valve control strategy needs to be set. Disadvantages of Method 2 above lie in that: cooperation of the two stations is required for the starting process, and a severe impulse current may be generated in case of inadequate control. When the station 2 is unlocked, an alternating current limiting resistor is still connected in series in the circuit, which can reduce the over-current of the station 1; however, at the transient of unlocking, the direct current voltage of the station 2 decreases to half of that before the unlocking, and a transient impulse current occurs in the station-2 converter.

The present invention is made in view of the disadvantages of the prior art described above.

SUMMARY OF THE INVENTION

An objective of the present invention is to provide a method for charging a modular multilevel converter, in which the converter is charged via a direct current side such that before normal operation of the converter, voltages of submodules reach a working voltage, and with a suitable control strategy, an impulse current is avoided during the charging process.

To achieve the foregoing objective, the present invention employs the following technical solution:

A method for charging a modular multilevel converter, the converter including at least one phase unit, each phase unit consisting of an upper bridge arm and a lower bridge arm, each bridge arm consisting of several submodules with identical structures and an electric reactor in series, the submodule consisting of an IGBT half bridge and a capacitor in parallel and including three working states: an on state, an off state, and a blocking state, the charging method including the following steps:

(1) electrifying DC side of the converter,
(2) deblocking the converter and turning on all the submodules after voltages of the submodules stabilize;
(3) reducing the number of turned-on submodules in the phase unit;

(4) determining whether over-current occurs in a bridge arm; if yes, going to Step (5); otherwise, going to Step (6);

(5) increasing the number of turned-on submodules in the phase unit, and returning to Step (4);

(6) determining whether the voltages of the submodules are stable; if yes, going, to Step (7); otherwise, returning to Step (4);

(7) determining whether the number of turned-on submodules in the phase unit is greater than the number of working submodules in one bridge arm; if yes, returning to Step (3); otherwise, going to Step (8); and (8) keeping the number of turned-on submodules in the phase unit constant;

where an end-of-charge condition is that charging processes of all the phase units in the converter reach Step (8).

In Step (1) above, the electrifying DC side of the converter means providing a direct current voltage for the converter by using another converter or an auxiliary direct current power supply connected to the DC side, to charge the submodules of the converter such that a drive of the submodules extracts energy and works normally, preparing for further increase of capacitor voltages of the submodules after the deblocking.

In Step (2) or Step (6) above, a criterion for determining that the voltages of the submodules are stable is that: a mean value of capacitor voltages of the submodules in the phase unit is greater than K times a direct current voltage divided by the number of turned-on submodules, with a lapse of time t, where 0<K<1, and a value range of t is 0 s to 10 s.

In Step (3) above, a value range of the number of turned-on submodules reduced in the phase unit is 1 to the number of submodules in the phase unit minus the number of working submodules in the bridge arm.

In Step (4) above, a criterion for determining that over-current occurs in a bridge arm is: when a current of the upper bridge arm or a current of the lower bridge arm is greater than an over-current fixed value $I_{set1}$, the bridge arm is in an over-current state; when the currents of the upper bridge arm and the lower bridge arm are both less than a return fixed value $I_{set2}$, the bridge arms are in a non-over-current state; otherwise, an original state is maintained, where the value of $I_{set1}$ is $K_1$ times an allowable maximum current of the submodules (0<$K_1$<1), and the value of $I_{set2}$ is $K_2$ times $I_{set1}$ (0<$K_2$<1).

In Step (5) above, a value range of the number of turned-on submodules added in the phase unit is 1 to the number of submodules in the phase unit minus the number of working submodules in the bridge arm.

In the foregoing charging method, by using a sorting balancing algorithm, a submodule with a relatively low capacitor voltage is preferentially selected to be turned on.

For a converter including multiple phase units, Steps (3)-(8) above are separately executed on each phase unit.

After the foregoing technical solution is employed, the present invention achieves the following advantageous effects:

(1) The operation is simple, and it is unnecessary to add primary equipment. The charging process has small impact on the converter, and is suitable for engineering applications:

(2) There is no current surge in the process of unlocking the converter and turning on all the submodules;

(3) By controlling the number of turned-on submodules in the phase unit to decrease, the capacitor voltages of the submodules gradually rise to the rated value, thus reducing the impulse current in the charging process;

(4) A bridge arm over-current suppression strategy is added, and the over-current that may occur upon a failure is reduced by temporarily increasing the number of turned-on submodules in the phase unit; and (5) When the charging is finished, the number of turned-on submodules in the phase unit is the same as the number of submodules that need to be turned on in normal operation, to achieve a smooth transition to a normal operation mode.

DETAILED DESCRIPTION OF THE INVENTION

Figure 1:
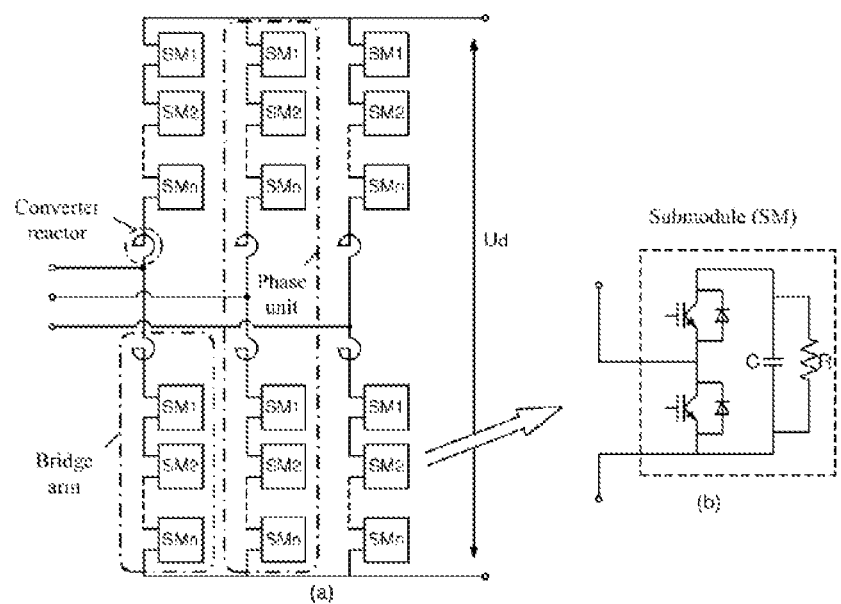
FIG. 1 is a schematic diagram of a main circuit topological structure of a two-phase modular multilevel converter (MMC)
Figure 2:
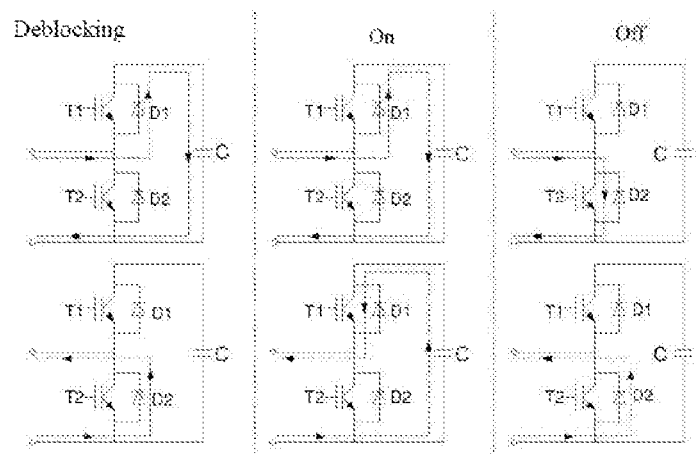
FIG. 2 is a schematic diagram of three working modes of submodules in a modular multilevel converter.

The technical solution of the present invention will be described in detail below with reference to the accompanying drawings and specific embodiments.

The present invention provides a method for charging a modular multilevel converter, in which the number of turned-on submodules in a phase unit is controlled to decrease such that capacitor voltages of submodules gradually rise to a rated value, thus avoiding an impulse current in a charging process. The method includes the following implementation steps:

(1) electrifying a direct current side of the converter, which mainly means providing a direct current voltage for the converter by using another converter or an auxiliary direct current power supply connected to the direct current side, to charge the submodules of the converter such that a drive of the submodules extracts energy and works normally, preparing for further increase of capacitor voltages of the submodules after the unlocking;

(2) unlocking the converter and turning on all the submodules after voltages of the submodules become stable, where a criterion for determining whether the voltages of the submodules are stable is that: a mean value of capacitor voltages of the submodules in the phase unit is greater than K times a direct current voltage divided by the number of turned-on submodules, with a lapse of time t, where 0<K<1, and a value range of t is 0 s to 10 s. By introducing the coefficient K less than 1, influence from a measurement error can be avoided, and the use of the lapse of time t can ensure that the capacitor voltages of the submodules rise to an ideal value;

(3) reducing the number of turned-on submodules in the phase unit, where a value range of the number is 1 to the number of submodules in the phase unit minus the number of working submodules in the bridge arm;

(4) determining whether over-current occurs in a bridge arm; if yes, going to Step (5); otherwise, going to Step (6), where a criterion for determining whether over-current occurs in a bridge arm is; when a current of the upper bridge arm or a current of the lower bridge arm is greater than an over-current fixed value $I_{set1}$, the bridge arm is in an over-current state; when the currents of the upper bridge arm and the lower bridge arm are both less than a return fixed value $I_{set2}$, the bridge arms are in a non-over-current state;

otherwise, an original state is maintained, where the value of $I_{set1}$ is $K_1$ times an allowable maximum current of the submodules ($0<K_1<1$), and the value of $I_{set2}$ is $K_2$ times $I_{set1}$ ($0<K_2<1$);

(5) increasing the number of turned-on submodules in the phase unit, where a value range of the number is 1 to the number of submodules in the phase unit minus the number of working submodules in the bridge arm, and then returning to Step (4);

(6) determining whether the voltages of the submodules are stable; if yes, going to Step (7); otherwise, returning to Step (4), where a criterion for determining whether the voltages of the submodules are stable is the same as the criterion in Step (3), and is not repeated herein;

(7) determining whether the number of turned-on submodules in the phase unit is greater than the number of working submodules in one bridge arm; if yes, returning to Step (3); otherwise, going to Step (8); and (8) keeping the number of turned-on submodules in the phase unit constant;

where an end-of-charge condition is that charging processes of all the phase units in the converter reach Step (8).

For a converter including multiple phase units, Steps (3)-(8) above are separately executed on each phase unit.

In the method for charging a modular multilevel converter provided by the present invention, by using a sorting balancing algorithm, a submodule with a relatively small capacitor voltage is preferentially selected to be turned on.

Figure 3:
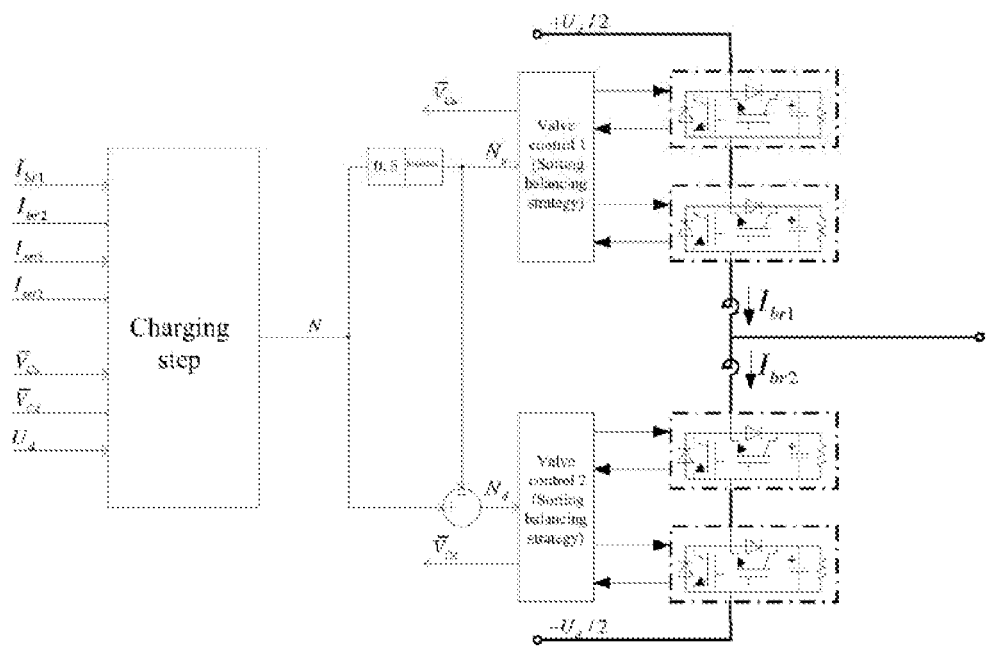
FIG. 3 is a system structure of a single-phase modular multilevel converter and a logic block diagram of a charging method according to the present invention.

According to the charging method in the present invention, the implementation of the charging process is described by using a single-phase modular multilevel converter as an example:

A system structure of the single-phase modular multilevel converter and a logic block diagram of converter charging by using the charging method provided by the present invention are shown in FIG. 3. The single-phase modular multilevel converter includes a phase unit, the phase unit consists of an upper bridge arm and a lower bridge arm, and each bridge arm consists of two submodules having identical structures and an electric reactor in series. The submodule consists of an IGBT half bridge and a capacitor in parallel, and may work in three states: an on state, an off state, and a locking state. The bridge arms use separate valve control devices, which are a valve control 1 and a valve control 2 respectively. The valve control 1 receives an instruction of the number $N_u$ of turned-on submodules in the upper bridge arm, collects capacitor voltages of the submodules in the upper bridge arm and calculates a mean value $\overline{V}_{cu}$, chooses to turn on $N_u$ submodules with relatively low capacitor voltages according to the sorting balancing algorithm, and turns off other submodules, to generate IGBT control signals of the submodules. The valve control 2 receives an instruction of the number $N_d$ of turned-on submodules of the lower bridge arm, collects capacitor voltages of the submodules of the lower bridge arm and calculates a mean value $\overline{V}_{cd}$, chooses to turn on $N_d$ submodules with relatively low capacitor voltages according to the soiling balancing algorithm, and turns off other submodules, to generate IGBT control signals of the submodules. A current measurement value of the upper bridge arm is $I_{br1}$, a current measurement value of the lower bridge arm is $I_{br2}$, and a voltage value of the direct current side of the converter is $U_d$. The number $N_u$ of turned-on submodules in the upper bridge arm and the number $N_d$ of turned-on submodules in the lower bridge arm are determined according to the number N of turned-on submodules of the phase unit generated in the charging process, and a calculation method is expressed as follows:

$$\begin{cases} N_u = [N/2] \\ N_d = N - N_R \end{cases}$$

Figure 4:
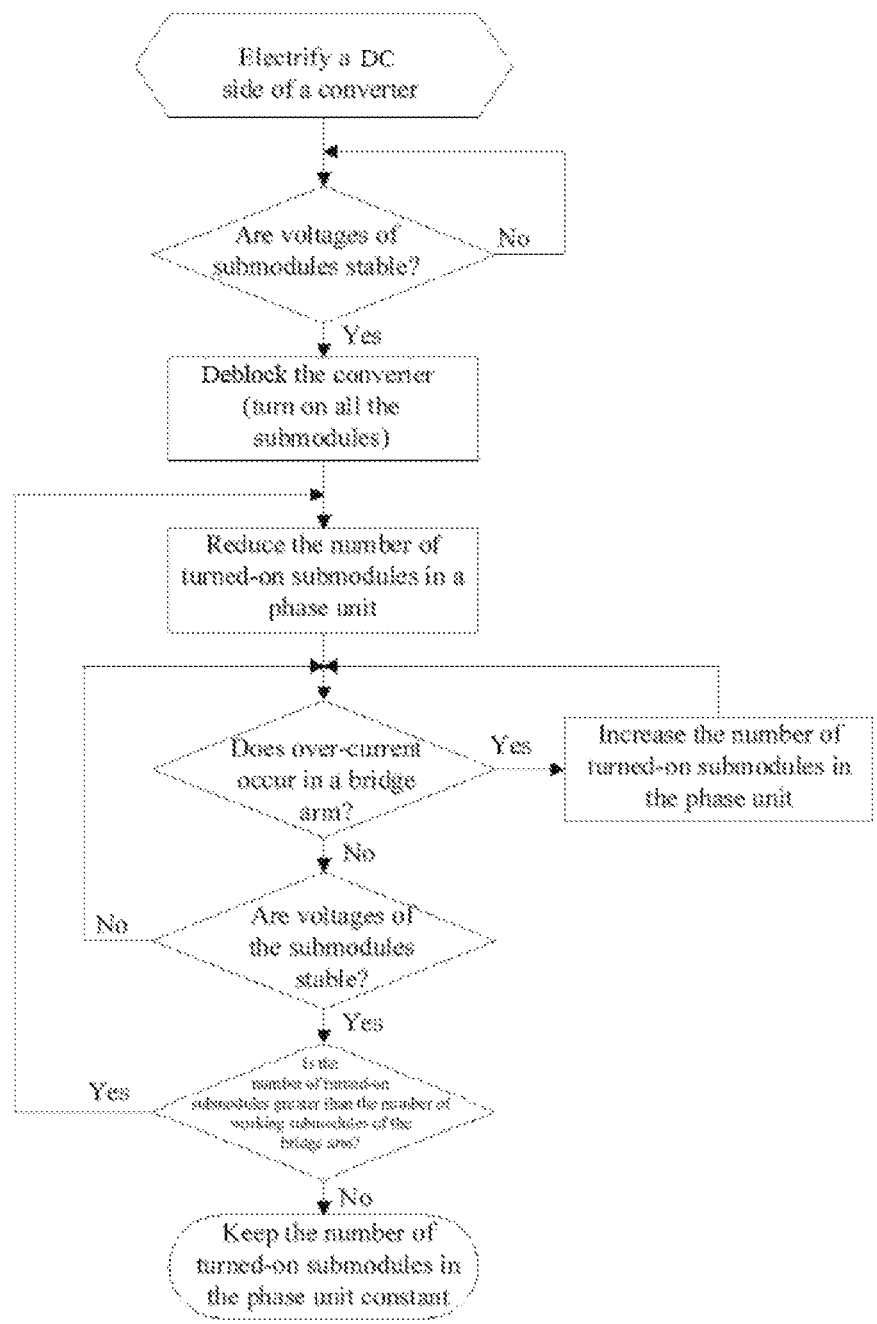
FIG. 4 is a flowchart illustrating submodule charging by using the charging method according to the present invention.

According to the specific charging process provided in FIG. 4, the direct current side of the converter is first electrified such that the direct current voltage slowly rises to 400 V, and the capacitor voltages of the submodules rise synchronously and finally stabilize at 100 V. Because a designed minimum energy extraction voltage is lower than this voltage, a drive of the submodules can extract energy and work normally.

Then the converter is unlocked, and all the submodules are turned on, that is, the four submodules are all in the on state (N=4). As superimposed voltages generated by the submodules are equal to 400 V, no impulse current is generated when the converter is unlocked.

After the unlocking, the number of turned-on modules in the phase unit is controlled to decrease by 1 (N=3), and in this case, one submodule is turned on in the upper bridge arm, and two submodules are turned on in the lower bridge arm. Because a total of superimposed voltages generated by the turned-on submodules is 300 V, which is less than the direct current voltage: 400 V, the capacitor voltages of the turned-on submodules rise. Because the upper bridge arm preferentially turns on a submodule with a relatively low voltage according to the sorting balancing algorithm, the two submodules in the upper bridge arm are turned on alternately in each execution cycle of the charging process such that the capacitor voltages of the submodules rise gradually.

An over-current fixed value $I_{set1}$ and a return fixed value $I_{set2}$ of the bridge arm of each submodule are set to 100 A and 90 A respectively. In the rising process of capacitor voltages of the submodules above, upon detection that a bridge arm current $I_{br1}$ or $I_{br2}$ is greater than the fixed value 100 A, the number of turned-on submodules is controlled to increase by 1 (N=4) such that a total of superimposed voltages generated by the submodules increases. In this case, the total of superimposed voltages is greater than 400 V, and the over-current can be suppressed. In over-current suppression, the voltages of the submodules can still rise. After the bridge arm currents $I_{br1}$ and $I_{br2}$ are both less than 90 A, the number of turned-on submodules is controlled to decrease by 1 (N=3) such that the capacitor voltages of the submodules continue to rise, till the capacitor voltages finally stabilize at 133.33 V.

After the voltages of the submodules become stable, the number of turned-on submodules in the phase unit continues to decrease by 1 (N=2). In this case, one submodule is turned on in the upper bridge arm, and one submodule is turned on in the lower bridge arm. A total of superimposed voltages generated by the submodules is 266.66 V, which is less than the direct current voltage: 400 V, and the capacitor voltages of the turned-on submodules continue to rise. Because the sorting balancing algorithm is used, the two submodules in the bridge arms are turned on alternately to increase the capacitor voltages.

In the rising process of capacitor voltages of the submodules above, upon detection that the bridge arm current $I_{br1}$ or $I_{br2}$ is greater than the fixed value 100 A, the number of turned-on submodules is controlled to increase by 1 (N=3) such that a total of superimposed voltages generated by the submodules increases. In this case, the total of superimposed voltages is greater than 400 V, and the over-current can be suppressed. In over-current suppression, the voltages of the submodules can still rise. After the bridge arm currents $I_{br1}$ and $I_{br2}$ are both less than 90 A, the number of turned-on submodules is controlled to decrease by 1 (N=2) such that the capacitor voltages of the submodules continue to rise, till the capacitor voltages finally stabilize at 200V. In this case, the end-of-charge condition is met, and the number of turned-on submodules (N=2) is kept constant, to smoothly transit to a normal operation state.

The charging method provided by the present invention is also applicable to a modular multilevel converter having multiple phase units, and the difference lies in that after the converter is unlocked by turning on all submodules, each phase unit is charged separately.

The embodiments above are merely used to describe the technical concept of the present invention, but are not intended to limit the protection scope of the present invention. Any change made on the basis of the technical solution according to the technical concept proposed in the present invention shall fall in the protection scope of the present invention.

What is claimed is:

1. A method for charging a modular multilevel converter, the modular multilevel converter comprising at least one phase unit, each phase unit consisting of an upper bridge arm and a lower bridge arm, each bride arm consisting of several submodules with identical structures and an electric reactor in series, the submodule consisting of an IGBT half bridge and a capacitor in parallel and comprising three working states: an on state, an off state, and a blocking state, the charging method comprising the following steps:
   (1) electrifying DC side of the modular multilevel converter, the electrifying the direct current side of the modular multilevel converter means providing a direct current voltage for the modular multilevel converter by using another converter or an auxiliary direct current power supply connected to the direct current side of the modular multilevel converter, to charge the submodules of the modular multilevel converter such that a drive of the submodules extracts energy and works normally, preparing for further increase of capacitor voltages of the submodules after the deblocking;
   (2) deblocking the modular multilevel converter and turning on all the submodules after voltages of the submodules are stable based on comparison to a predetermined criterion:
   (3) reducing the number of turned-on submodules in the phase unit;
   (4) determining whether over-current occurs in a bridge arm; if yes, going to Step (5); otherwise, going to Step (6);
   (5) increasing the number of turned-on submodules in the phase unit, and returning to Step (4);
   (6) determining whether the voltages of the submodules are stable based on comparison to the predetermined criterion; if yes, going to Step (7): otherwise, returning to Step (4);
   (7) determining whether the number of turned-on submodules in the phase unit is greater than the number of working submodules in one bridge arm: if yes, returning to Step (3); otherwise, going to Step (8): and
   (8) keeping the number of aimed-on submodules in the phase unit constant;
   wherein an end-of-charge condition is that charging processes of all the phase units in the modular multilevel converter reach Step (8).

2. The method for charging a modular multilevel converter according to claim 1, wherein in Step (2) or Step (6), the predetermined criterion for determining that the voltages of the submodules are stable is that: a mean value of capacitor voltages of the submodules in the phase unit is greater than K times a direct current voltage divided by the number of turned-on submodules, with a lapse of time t, wherein 0<K<1, and a value range of t is 0 s to 10 s.

3. The method for charging a modular multilevel converter according to claim 1, wherein in Step (3), a value range of the number of turned-on submodules reduced in the phase unit is 1 to the number of submodules in the phase unit minus the number of working submodules in the bridge arm.

4. The method for charging a modular multilevel converter according to claim 1, wherein in Step (4) above, a criterion for determining that over-current occurs in a bridge arm is: when a current of the upper bridge arm or a current of the lower bridge arm is greater than an over-current fixed value $I_{set1}$, the bridge arm is in an over-current state; when the currents of the upper bridge arm and the lower bridge arm are both less than a return fixed value $I_{set2}$, the bridge arms are in a non-over-current state; otherwise, an original state is maintained, where the value of $I_{set1}$ is $K_1$ times an allowable maximum current of the submodules (0<$K_1$<1), and the value of $I_{set2}$ is $K_2$ times $I_{set1}$ (0<$K_2$<1).

5. The method for charging a modular multilevel converter according to claim 1, wherein in Step (5), a value range of the number of turned-on submodules added in the phase unit is 1 to the number of submodules in the phase unit minus the number of working submodules in the bridge arm.

6. The method for charging a modular multilevel converter according to claim 1, wherein in the charging method, by using a sorting balancing algorithm, a submodule with a relatively low capacitor voltage is preferentially selected to be turned on.

7. The method for charging a modular multilevel converter according to claim 1, wherein for a modular multilevel converter comprising multiple phase units, Steps (3)-(8) are separately executed on each phase unit.

* * * * *